(12) United States Patent
Glaeser et al.

(10) Patent No.: US 7,126,653 B2
(45) Date of Patent: Oct. 24, 2006

(54) LIQUID CRYSTAL PICTURE SCREEN WITH COLLIMATOR HAVING MICROPRISMS

(75) Inventors: Harald Glaeser, Aachen (DE); Hans-Helmut Bechtel, Roetgen (DE); Dietrich Bertram, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 147 days.

(21) Appl. No.: 10/478,073

(22) PCT Filed: May 21, 2002

(86) PCT No.: PCT/IB02/01861

§ 371 (c)(1),
(2), (4) Date: Nov. 18, 2003

(87) PCT Pub. No.: WO02/095489

PCT Pub. Date: Nov. 28, 2002

(65) Prior Publication Data

US 2004/0135935 A1    Jul. 15, 2004

(30) Foreign Application Priority Data

May 23, 2001    (DE)    ................................. 101 25 553

(51) Int. Cl.
*G02F 1/1335*    (2006.01)
*F21V 5/00*    (2006.01)
*F21V 5/02*    (2006.01)

(52) U.S. Cl. .................... 349/62; 349/95; 362/330; 362/339

(58) Field of Classification Search ................ 349/57, 349/62, 64, 95; 359/625, 640; 362/331, 362/333, 339
See application file for complete search history.

(56) References Cited

U.S. PATENT DOCUMENTS 5,598,281 A * 1/1997 Zimmerman et al. .......... 349/5
5,839,823 A   11/1998 Hou et al. .................. 362/327

\* cited by examiner

*Primary Examiner*—Andrew Schechter
*Assistant Examiner*—Michael H. Caley

(57) ABSTRACT

The invention relates to a liquid crystal picture screen provided with a background lighting system which comprises at least one light source and a collimator formed by hourglass-shaped microprisms. The light of the light source can be effectively collimated within a desired angular range by means of the collimator.

16 Claims, 2 Drawing Sheets

LIQUID CRYSTAL PICTURE SCREEN WITH COLLIMATOR HAVING MICROPRISMS

The invention relates to a liquid crystal picture screen provided with a background lighting system which comprises at least one light source and a collimator composed of microprisms, which microprisms have a three-dimensional shape with a light entry surface, at a distance from the light entry surface a light exit surface, and at least one side face between the light entry surface and the light exit surface. The invention further relates to a background lighting system, a collimator composed of microprisms, and a luminaire.

Liquid crystal picture screens are passive display systems, i.e. they do not themselves emit light. These picture screens are based on the principle that light does or does not pass through the layer of liquid crystals. This means that an external light source is necessary for generating a picture. Ambient light is used as the external light source in reflective liquid crystal picture screens. In transmissive liquid crystal picture screens, artificial light is generated in a background lighting system.

A liquid crystal picture screen has a particularly high contrast if the angle of the incident operational light does not exceed the values of±60° horizontally to the perpendicular of the picture screen and ±15 ° vertically to the perpendicular of the picture screen. It is accordingly advantageous to collimate as much light as possible emitted by the background lighting system within this favorable angular range.

U.S. Pat. No. 5,839,823, for example, describes a collimator for a liquid crystal picture screen which consists of an array of microprisms. The microprisms have a pointed shape, i.e. the light entry surface of a microprism is smaller than the light exit surface. Light-reflecting elements are present in the spaces between the individual microprisms, for example a highly reflective powder so as to reflect light rays incident there back in the direction of the light source. The light ray may then be reflected by the light source or by a reflector once more in the direction of the collimator ("recycling" of the light rays).

It is a disadvantage that a light ray which hits the highly reflective powder in the vicinity of the edges of the light entry surface of a microprism can enter the microprism through the side face owing to scattering, thus detracting from the collimator action. Furthermore, light rays may enter the microprism through the edges, which are not perfect, but slightly rounded. These light rays may be at angles to the perpendicular of the picture screen which lie outside the optimum angular range. All in all, an increased reflection reduces the efficiency of the liquid crystal picture screen.

It is accordingly an object of the invention to counteract the disadvantages of the prior art and to make available a liquid crystal picture screen with an improved background lighting system.

This object is achieved by means of a liquid crystal picture screen provided with a background lighting system which comprises at least one light source and a collimator composed of microprisms, which microprisms have a three-dimensional shape with a light entry surface, at a distance from the light entry surface a light exit surface, and at least one side face between the light entry surface and the light exit surface, wherein each microprism has at least one narrowed portion between the light entry surface and the light exit surface.

The light can be effectively collimated into a desired angular region owing to the hourglass shape of the microprisms.

It is particularly preferred that the light entry surface and the light exit surface of each microprism are of the same size.

The intervening spaces between the individual light entry surfaces are very small owing to this advantageous embodiment. The number of reflections is reduced thereby.

It is advantageous when the light entry surfaces have a rectangular shape.

In this embodiment there is no intervening space which is to be covered against light penetration between the individual light entry surfaces of the microprisms. Each and every light ray propagating in the direction of the collimator is accordingly collimated thereby. This enhances the efficiency of the background lighting system, because fewer reflections will take place.

It is furthermore advantageous that the light entry surfaces of the microprisms have a common, closed surface.

It is avoided in this embodiment that light rays enter the microprism through imperfect edges of the light entry surfaces of the microprism.

The invention further relates to a background lighting system which comprises at least one light source and a collimator composed of microprisms, and to a collimator composed of microprisms, which microprisms have a three-dimensional shape with a light entry surface, at a distance to the light entry surface a light exit surface, and at least one side face between the light entry surface and the light exit surface, wherein each microprism has at least one narrowed portion between the light entry surface and the light exit surface. The invention also relates to a luminaire which comprises at least one light source, a housing, and a collimator composed of microprisms, and to a collimator composed of microprisms, which microprisms have a three-dimensional shape with a light entry surface, at a distance to the light entry surface a light exit surface, and at least one side face between the light entry surface and the light exit surface, wherein each microprism has at least one narrowed portion between the light entry surface and the light exit surface.

The invention will now be explained in more detail below with reference to four Figures, in which.

A liquid crystal picture screen usually comprises a liquid crystal unit and a background lighting system. The liquid crystal unit comprises two polarizers and a liquid crystal cell which has two transparent plates, each supporting a matrix of light-transmitting electrodes. A liquid crystal material is provided between the two transparent plates. The liquid crystal material preferably comprises TN (twisted nematic) liquid crystals, STN (super twisted nematic) liquid crystals, DSTN (double super twisted nematic) liquid crystals, FSTN (foil super twisted nematic) liquid crystals, VAN (vertically aligned) liquid crystals, or OCB (optically compensated bend) liquid crystals. The liquid crystal cell is sandwiched between the two polarizers.

The liquid crystal unit may be provided with a color filter for generating and displaying colored images.

Figure 1:
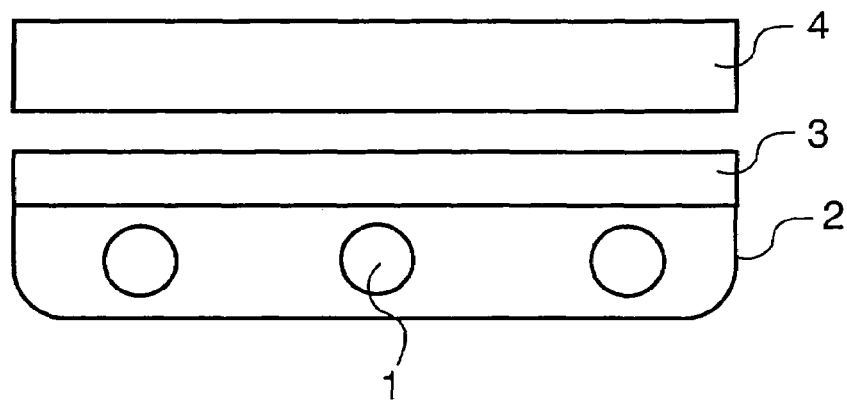
FIG. 1 is a cross-sectional view of a background lighting system.

In FIG. 1, a background lighting system comprises at least one light source 1, which is, for example, an incandescent lamp, a light-emitting diode (LED), a metal vapor or halogen high intensity discharge (HID) lamp, or a fluorescent lamp such as, for example, a xenon discharge lamp. The light source 1 is usually present in a housing 2, which may have, for example, a rectangular or parabolic shape. The light rays emitted by the light source 1 pass through an opening in the housing 2 towards the collimator 4. The inside of the housing 2 preferably comprises a reflector. This reflector may be formed by a diffusely or specularly reflecting material such as, for example, polished aluminum or white pigments. It is the task of the reflector to reflect light rays propagating not in the direction of the collimator 4 back into this direction. A diffuser 3 may be present between the light source 1 and the collimator 4.

Figure 2:
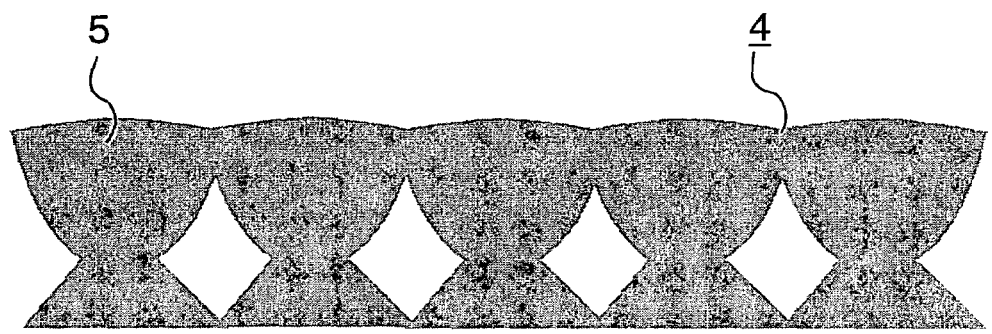
FIG. 2 shows a collimator in cross-section.

FIG. 2 shows a collimator 4 according to the invention. The collimator 4 comprises a plurality of microprisms which are arranged in an array.

Figure 3:
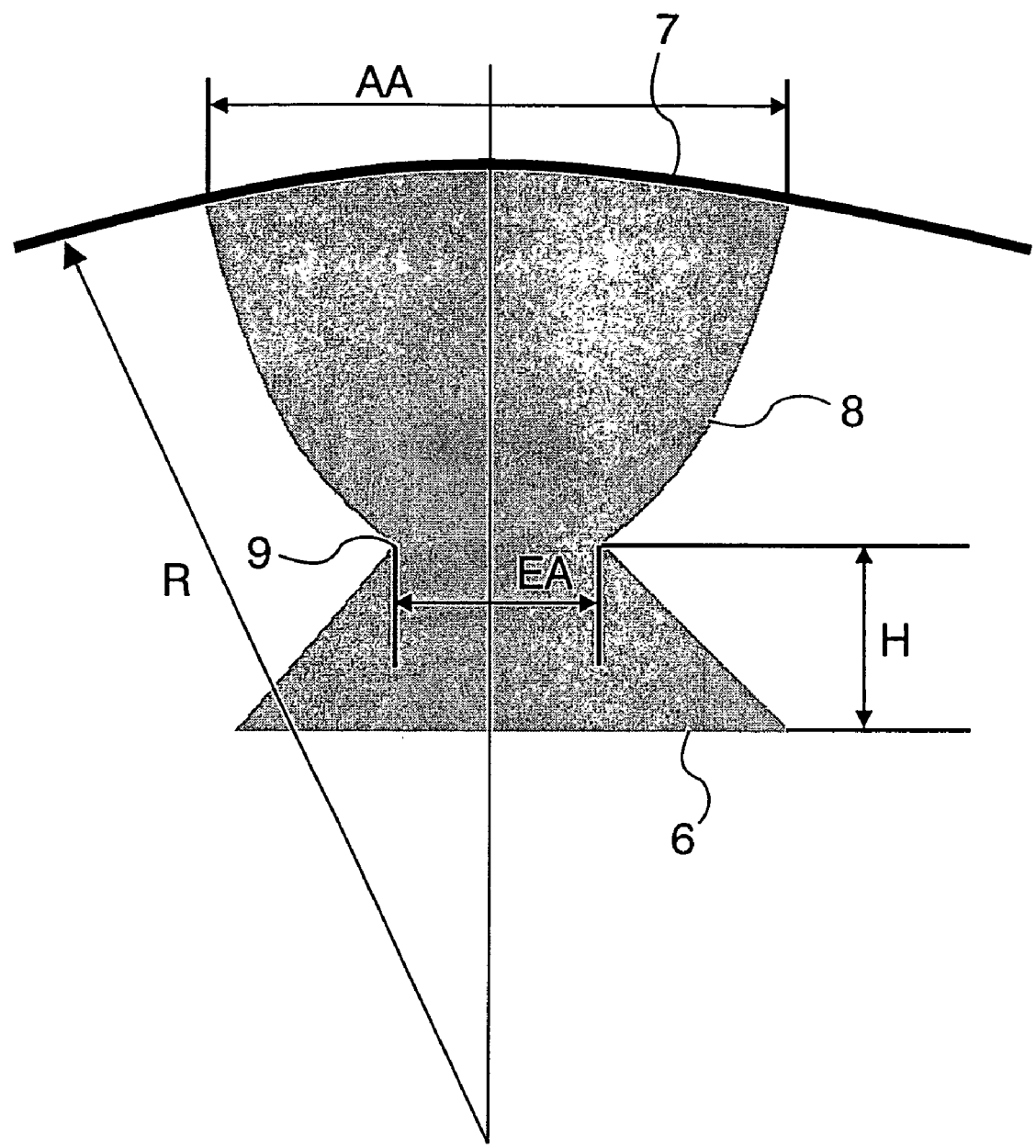
FIG. 3 shows a microprism of a collimator in cross-section.

As is shown in FIG. 3, each microprism 5 has a dual structure with a lower part, an upper part, a light entry surface 6, and at a distance from this light entry surface 6 a light exit surface 7. It is particularly advantageous that the lower part and the upper part are in optical contact. There is at least one side face 8 between the light entry surface 6 and the light exit surface 7. Each microprism 5 further has a narrowed portion 9. A preferred shape of the microprism 5 is that it has a narrowed portion 9 and narrows from the light entry surface 6 towards the narrowed portion 9, and widens again from the narrowed portion 9 in the direction of the light exit surface 7.

The size of the light entry surface 6 is preferably equal to the size of the light exit surface 7. The light entry surface 6 and the light exit surface 7 may have any shape, as desired, preferably a rectangular shape. If the light entry surfaces 6 and the light exit surfaces 7 do not have a rectangular shape, the resulting intervening spaces are to be shielded each with a reflecting element, for example a highly reflective powder or a reflective mask. The light entry surface 6 and the light exit surface 7 of a microprism 5 may be planar, concave, or convex.

Depending on the shape of the microprism 5, the microprism 5 may have, for example, four side faces 8 or one side face 8. It is also possible for the microprism 5 to have four side faces 8 in the region from the light entry surface 6 up to the narrowed portion 9, and one side face 8 in the region from the narrowed portion 9 up to the light exit surface 7.

A side face 8 may be planar, concave, or convex.

If a microprism has four side faces 8 extending from the light entry surface 6 up to the light exit surface 7, the narrowed portion 9 may be formed by two mutually opposed side faces 8 or by all four side faces 8. If the narrowed portion 9 is formed by two mutually opposed side faces 8, the light rays are collimated in one plane. In this embodiment, two mutually opposed side faces 8 first approach one another along a path H, starting from the light entry surface 6. At the end of this path, the two mutually opposed side faces 8 have a minimum distance EA to one another. The minimum distance EA is the width of the narrowed portion 9. After the narrowed portion 9, the two mutually opposed side faces 8 move away from one another again.

If the narrowed portion 9 is formed by four side faces 8, the light rays are collimated in two planes. In this embodiment, two pairs of mutually opposed side faces 8 first approach one another along a path H, starting from the light entry surface 6. At the end of this path, the two pairs of mutually opposed side faces 8 each have a minimum distance EA to one another, which minimum distances are preferably equally great in both cases. The respective minimum distance EA between two mutually opposed side faces 8 is the width of the narrowed portion 9 in situ. After the narrowed portion 9, the two pairs of mutually opposed side faces 8 move away from one another again. In an alternative embodiment, all four side faces 8 may extend towards one another.

Alternatively, the narrowed portion 9 may be formed by a region where the respective mutually opposed side faces 8 are at a minimum distance to one another in either embodiment. In this case, the mutually opposed side faces 8 will extend parallel to one another over a certain distance, and then move away from one another again.

Alternatively, the microprism 5 may have a cylindrical symmetrical shape with one side face 8. In this embodiment, the light rays are collimated in each and every plane extending through the axis of symmetry of the cylinder.

The light entry surfaces 6 and/or the light exit surfaces 7 of the individual microprisms 5 may together constitute a closed surface.

The microprisms 5 comprise transparent materials with a refractive index n greater than 1.0 such as, for example, polymethylmethacrylate, polycarbonate, or glass. A microprism 5 may alternatively comprise several transparent materials with different refractive indices. Thus, for example, the refractive index of the transparent materials may increase or decrease gradually in a direction away from the light entry surface 6. The side faces 8 may be provided with a reflective coating comprising a material of high reflectivity in the region of the light entry surface 6 up to the narrowed portion 9.

Figure 4:
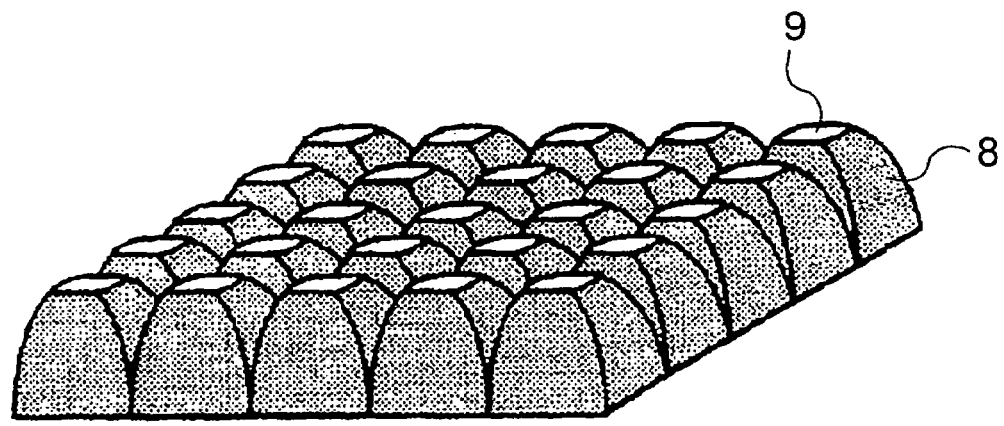
FIG. 4 shows an array of lower parts of the microprisms.

The manufacture of a collimator 4 according to the invention may take place in an injection molding process or some other suitable process such as, for example, photopolymerization. The collimator 4 is preferably manufactured through the manufacture of several molded parts which are subsequently adhered together. To achieve this, a first molded part as shown in FIG. 4 is manufactured, which is an array of lower parts of the microprisms 5. A lower part is the region from the light entry surface 6 up to the narrowed portion 9 of a microprism 5. A second molded part forms an array of upper parts of the microprisms. An upper part is the region from the narrowed portion 9 up to the light exit surface 7 of a microprism 5.

To manufacture the first or second molded part, the negative of the first or second molded part is milled into aluminum. Then, for example, a self-curing or UV-curing polymer is injected into the mold.

Coating of the side faces 8 of the lower parts takes place in that first the entire first molded part is coated with a photoresist in a spin coating process. Then the narrowed portions 9 are exposed through a mask, so that the photoresist is cured in these locations. In the next step, the non-exposed, i.e. non-cured parts of the photoresist are removed with water. Silver or aluminum is then vapor-deposited on the first molded part. The layer thickness of the metal layer is preferably greater than 200 nm here. Any remaining photoresist covered with a metal layer is swollen by means of $HNO_3$. The photoresist together with the metal layer present thereon may then be removed with a jet of water.

Alternatively, an aluminum or silver layer may be structured in that first the entire first molded part is coated with the metal layer from a vapor. Then a photoresist is provided, which is exposed through a mask which is closed in those locations where the narrowed portions 9 are present. During development, the non-exposed photoresist is removed from the narrowed portions 9. The metal layer present on the narrowed portions 9 is subsequently removed in an etching step with sodium lye.

In a further alternative embodiment, the narrowed portions 9 may be covered by a contact mask during vapor deposition.

The first and the second molded part may be connected to one another by means of an adhesive, for example an acrylate glue. The molded parts are preferably glued together such that they are in optical contact with one another. The adhesive preferably has the same refractive index as the material of the molded parts.

If the light entry surface 6 or the light exit surface 7 of a microprism 5 is to be concavely curved, a third molded part having a corresponding suitable shape may be manufactured and may be connected to the second molded part.

Alternatively, the collimator 4 may comprise microprisms 5 which are hollow bodies. In this embodiment, a third and a fourth molded part are manufactured, which are subsequently glued together. The third molded part has the negative shape of the first molded part and forms an array of lower parts of the hollow microprisms 5. The fourth molded part has the negative shape of the second molded part and forms an array of upper parts of the hollow microprisms 5. The two molded parts preferably comprise transparent materials such as polymethylmethacrylate, polycarbonate, or glass. The interior side faces 8 of the upper and lower parts of the hollow microprisms 5 are vapor-deposited with silver or aluminum, and the two molded parts are connected to one another with an adhesive. To manufacture the third or fourth molded part, the shape of the first or second molded part may be milled into aluminum. Then, for example, a self-curing or UV-curing polymer is injected into the mold.

Such a collimator 4 may also be used in a luminaire which is present, for example, in an office or living room. Such a luminaire comprises a light source which is present in a housing. Preferably, the light source is present in a reflecting housing. The light rays emitted by the light source pass through an opening in the housing to the collimator and are collimated there.

The invention claimed is:

1. A liquid crystal picture screen comprising:
   a liquid crystal panel, and
   a background lighting system that includes:
      at least one light source, and
      a collimator that includes a plurality of microprisms;
   wherein
   each microprism of the plurality of microprisms includes:
      a light entry surface,
      a light exit surface at a distance from the light entry surface,
      at least one side face between the light entry surface and the light exit surface, and
      at least one portion between the light entry surface and the light exit surface that has a narrower cross-section than each of the light entry and exit surfaces.

2. The liquid crystal picture screen of claim 1, wherein the light entry surface and the light exit surface of each microprism are of the same size.

3. The liquid crystal picture screen of claim 1, wherein the light entry surfaces have a rectangular shape.

4. The liquid crystal picture screen of claim 1, wherein the light entry surfaces of the microprisms have a common, closed surface.

5. A background lighting system comprising:
   at least one light source, and
   a collimator that includes a plurality of microprisms,
   wherein
   each microprism of the plurality of microprisms includes:
      a light entry surface,
      a light exit surface at a distance from the light entry surface,
      at least one side face between the light entry surface and the light exit surface, and
      at least one portion between the light entry surface and the light exit surface that has a narrower cross-section than each of the light entry and exit surfaces.

6. The background lighting system of claim 5, wherein the light entry surface and the light exit surface of each microprism are of the same size.

7. The background lighting system of claim 5, wherein the light entry surfaces have a rectangular shape.

8. The background lighting system of claim 5, wherein the light entry surfaces of the microprisms have a common, closed surface.

9. A collimator comprising
   a plurality of microprisms,
   each microprism of the plurality of microprisms including:
      a light entry surface,
      a light exit surface at a distance from the light entry surface,
      at least one side face between the light entry surface and the light exit surface, and
      at least one portion between the light entry surface and the light exit surface that has a narrower cross-section than each of the light entry and exit surfaces.

10. The collimator of claim 9, wherein the light entry surface and the light exit surface of each microprism are of the same size.

11. The collimator of claim 9, wherein the light entry surfaces have a rectangular shape.

12. The collimator of claim 9, wherein the light entry surfaces of the microprisms have a common, closed surface.

13. A luminaire comprising:
   at least one light source,
   a housing, and
   a collimator that includes a plurality of microprisms,
   wherein
   each microprism of the plurality of microprisms includes:
      a light entry surface,
      a light exit surface at a distance from the light entry surface,
      at least one side face between the light entry surface and the light exit surface, and
      at least one portion between the light entry surface and the light exit surface that has a narrower cross-section than each of the light entry and exit surfaces.

14. The luminaire of claim 13, wherein the light entry surface and the light exit surface of each microprism are of the same size.

15. The luminaire of claim 13, wherein the light entry surfaces have a rectangular shape.

16. The luminaire of claim 13, wherein the light entry surfaces of the microprisms have a common, closed surface.

* * * * *